April 16, 1940.  W. F. HARRIETT  2,197,363
NAILING MACHINE
Filed Oct. 21, 1938  8 Sheets-Sheet 1

INVENTOR.
William F. Harriett
BY Conrad A. Dietrich
his ATTORNEY.

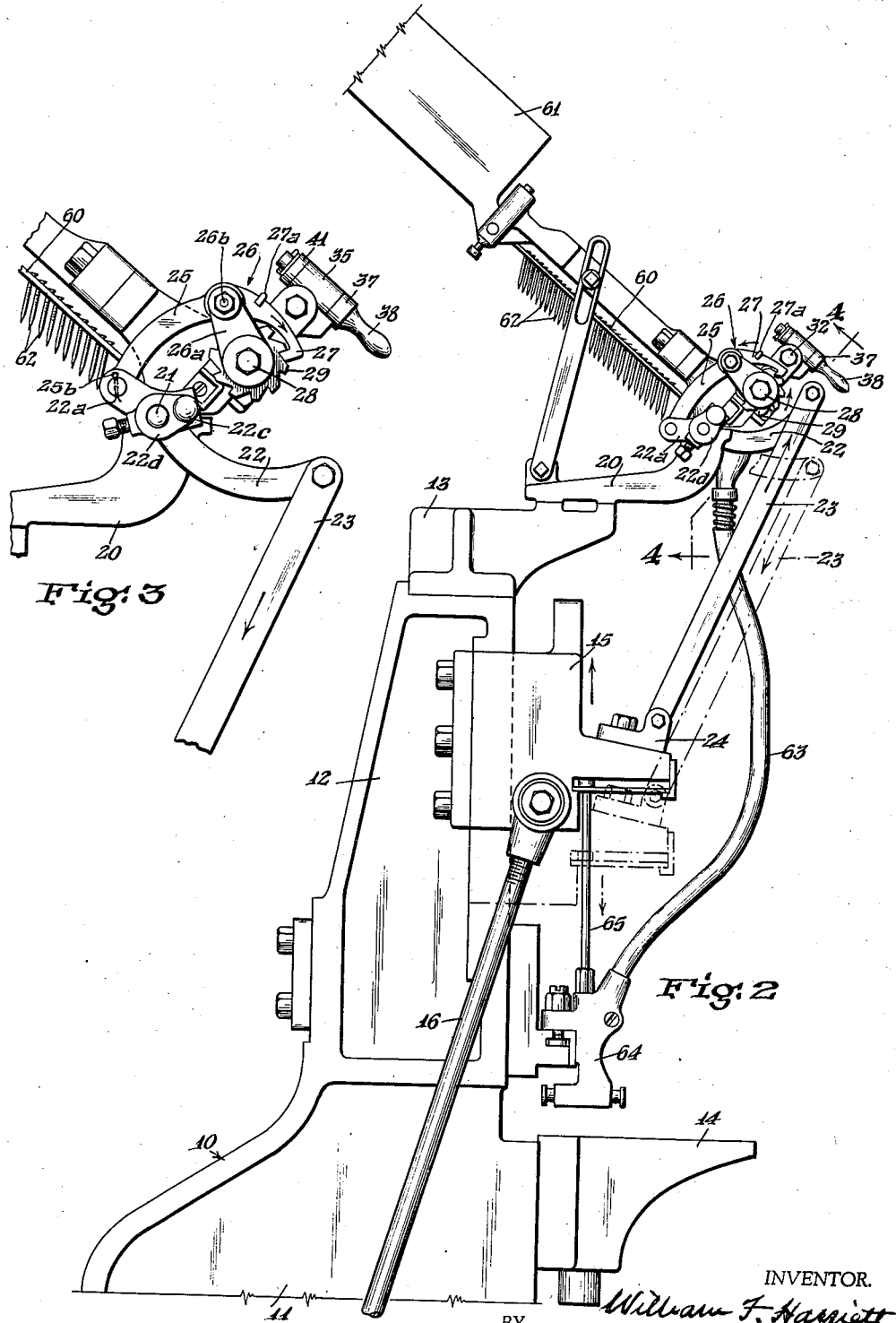

April 16, 1940.  W. F. HARRIETT  2,197,363
NAILING MACHINE
Filed Oct. 21, 1938  8 Sheets-Sheet 3
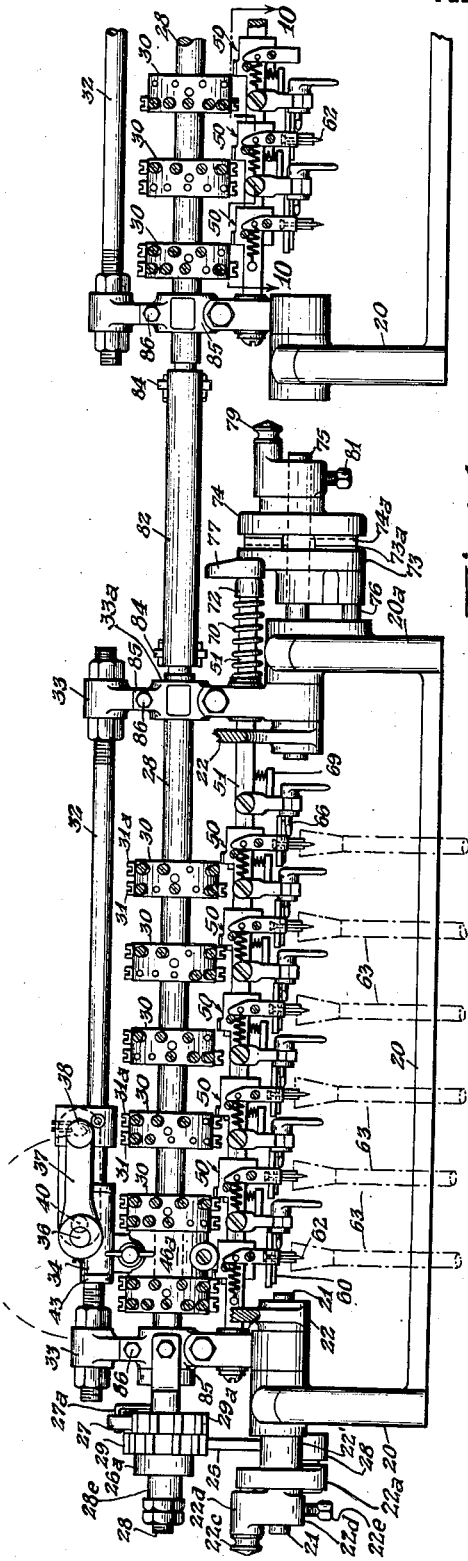
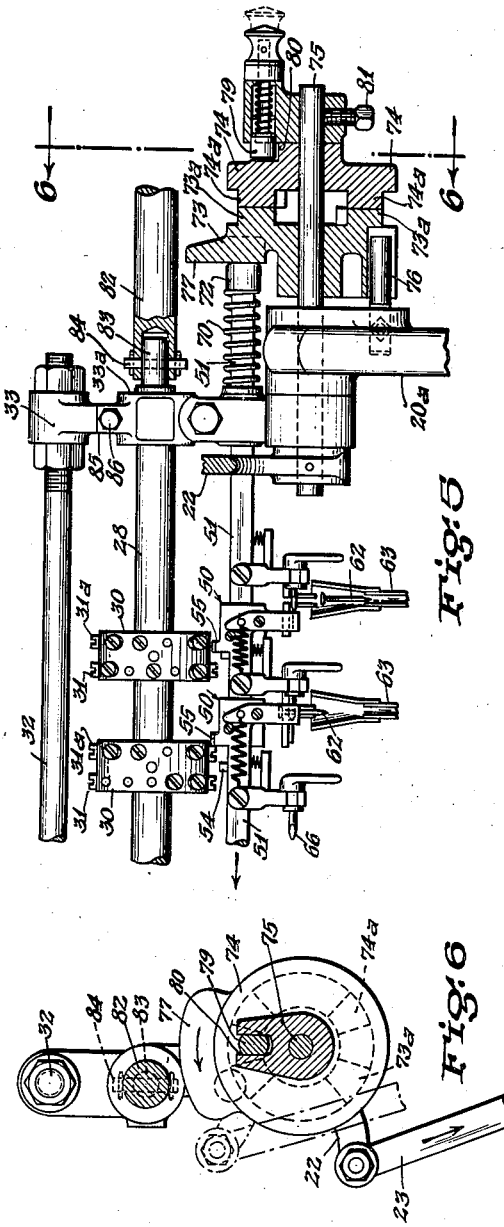
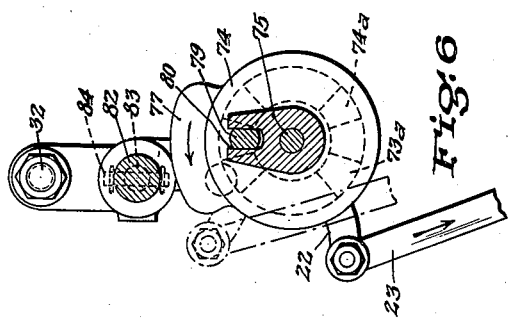
INVENTOR.
William F. Harriett
BY
ATTORNEY.

April 16, 1940.  W. F. HARRIETT  2,197,363
NAILING MACHINE
Filed Oct. 21, 1938  8 Sheets-Sheet 4
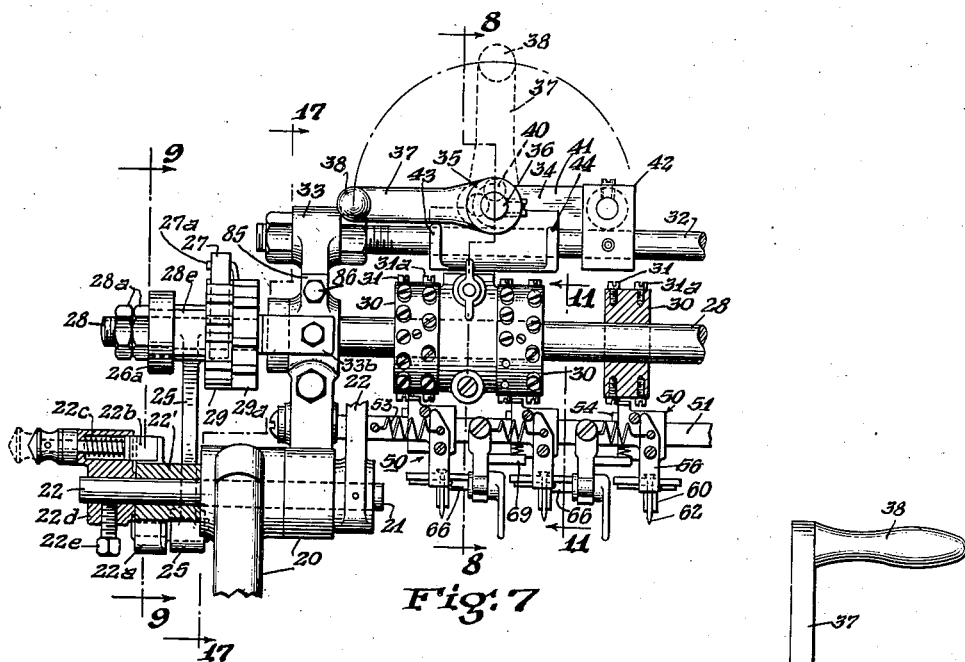
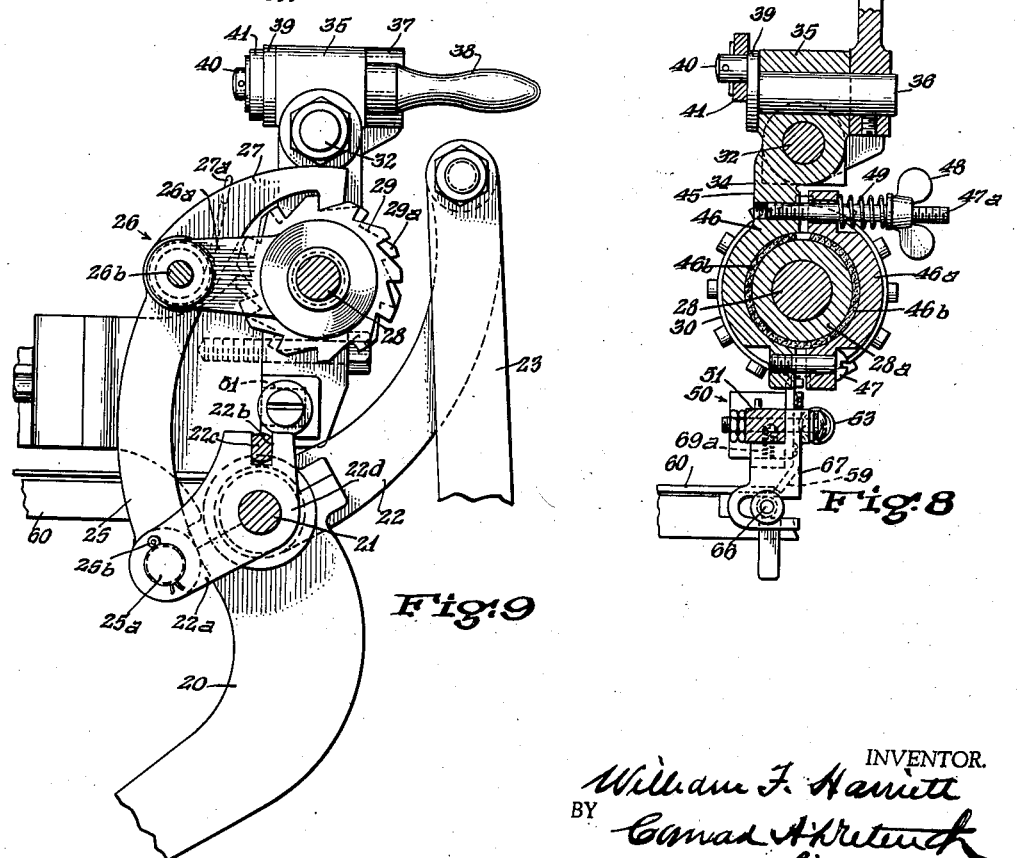
INVENTOR.
William F. Harriett
BY
his ATTORNEY.

April 16, 1940.  W. F. HARRIETT  2,197,363
NAILING MACHINE
Filed Oct. 21, 1938  8 Sheets-Sheet 5
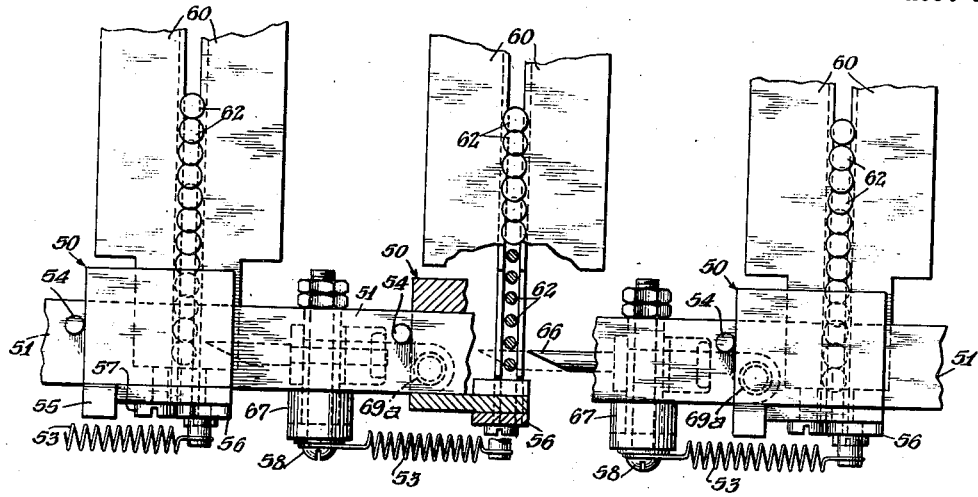
Fig. 10
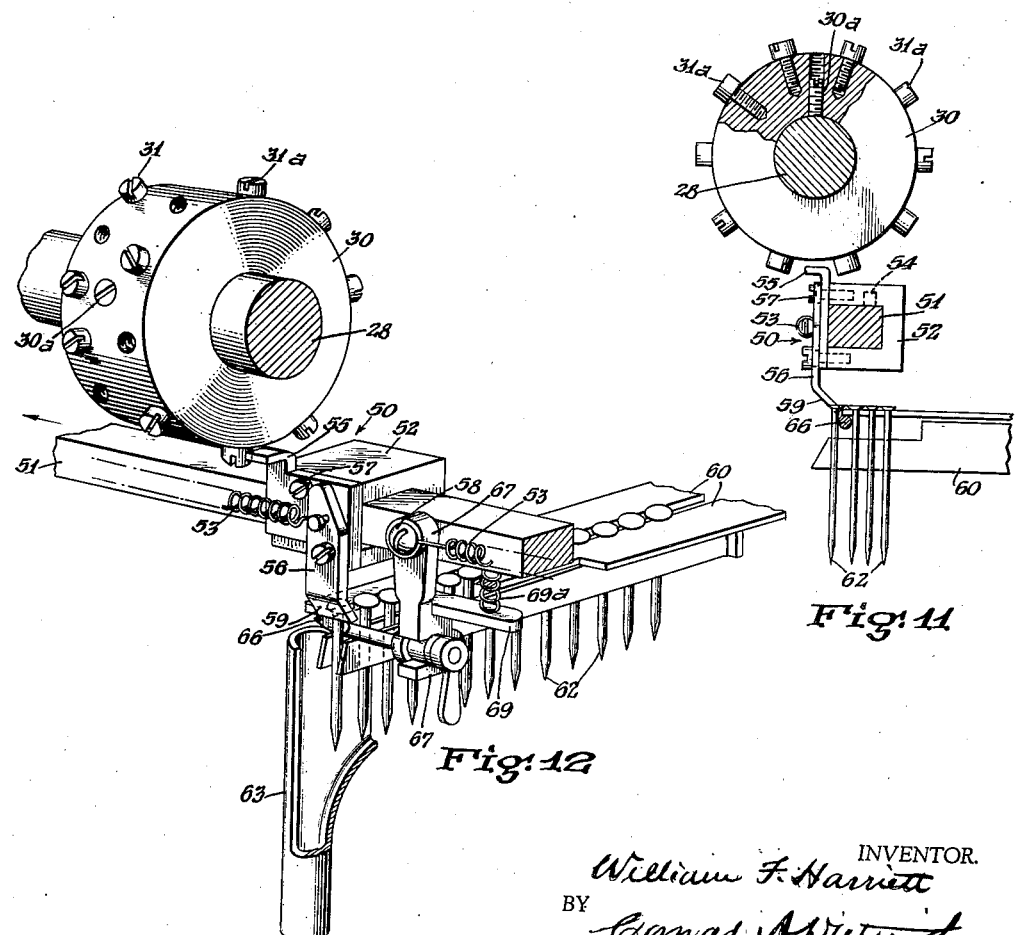
Fig. 11
Fig. 12
INVENTOR.
William F. Harriett
BY Conrad A. Wietuch
ATTORNEY April 16, 1940. W. F. HARRIETT 2,197,363
NAILING MACHINE
Filed Oct. 21, 1938 8 Sheets-Sheet 6

INVENTOR.
William F. Harriett
BY
his ATTORNEY.

April 16, 1940. W. F. HARRIETT 2,197,363
NAILING MACHINE
Filed Oct. 21, 1938 8 Sheets-Sheet 8

INVENTOR.
William F. Harriett
BY Conrad A. Dieterich
his ATTORNEY.

Patented Apr. 16, 1940

2,197,363

UNITED STATES PATENT OFFICE 2,197,363

NAILING MACHINE

William F. Harriett, Woodhaven, N. Y., assignor to William S. Doig Inc., Brooklyn, N. Y., a corporation of New York Application October 21, 1938, Serial No. 236,205

18 Claims. (Cl. 1—16)

My invention relates to improvements in nailing machinery, and the same has for its object generally to provide an efficient and reliable machine which operates automatically to feed or deliver the nails to the work in a desired order determined by an adjustment or regulation of the machine selectively varied at will by the operator.

Further, said invention has for its object to provide a nailing machine in which the selective means, in accordance with the adjustment thereof, controls the delivery of successive groups or rows of nails to the work in predetermined numbers and arrangement.

Further, said invention has for its object to provide a nailing machine in which the selective means, when duly adjusted, controls the feed or delivery of the successive groups of nails to the work in a predetermined order irrespective of the number and arrangement of the nails.

Further, said invention has for its object to provide a nailing machine in which the several nail feeding or delivery means are controllable to prevent the feeding operation of certain or all of the nail feeding means, according to the selective adjustment made by the operator.

Further, said invention has for its object to provide a nailing machine in which the selective controlling means is adjustable for delivering the nails in groups or rows in proper sequential order to various successions of articles constituting the work to be operated upon, and differing from each other in the number of rows of nails or nailing operations required to unite the parts of the articles forming the respective successions of articles.

Further, said invention has for its object to provide a nailing machine in which the feed controlling means is governed by a plurality of means having different control characteristics each capable of being brought into or out of operative relation to the controlling means so that under one governing control a run of articles each requiring a number of nailing strokes constituting a divisor of one number and under the other governing control a run of articles requiring a number of nailing strokes constituting a divisor of a different number can be operated upon in proper and repeated sequential order.

Further, said invention has for its object to provide a nailing machine in which the several feed governing means may be bodily shifted as a gang from one position to the other by the actuation of a suitable manually operated mechanism.

Further, said invention has for its object to provide a nailing machine in which said shifting means serves as a brake to prevent erratic, retrograde or other undue movement of the governing means.

Further, said invention has for its object to provide a nailing machine in which are included means for advancing the feed governing means, when in one control position, at a different rate from that of the governing means when in the other control position.

Further, said invention has for its object to provide a nailing machine in which a feed governing means possessing one distinctive feed control characteristic may be bodily removed as a unit from the machine and replaced at will by a similar unit possessing a different feed control characteristic.

Further, said invention has for its object to provide a nailing machine in which the control means for releasing the nails is reciprocated in a positive manner by cam mechanism producing a linear movement in the direction of the line of reciprocation of the control means.

Other objects will in part be obvious and in part be pointed out hereinafter.

To the attainment of the aforesaid objects and ends my invention consists in the novel features of construction, and in the combination, connection and arrangement of parts hereinafter more fully described and then pointed out in the claims.

In the accompanying drawings—

Fig. 2 is an enlarged side elevation of the upper portion of the machine;

Fig. 3 is an enlarged detail end view of the ratchet mechanism for actuating the selective nail feeding means;

Fig. 4 is a front elevation partly in section on the line 4—4 of Figs. 1 and 2 showing the manner of connecting two sets of nail feeding mechanism.

Fig. 5 is an enlarged detail front view, partly in section, showing the cam means at the right-hand end of the machine for actuating the nail-picking or releasing means;

Fig. 6 is a detail section on the line 6—6 of Fig. 5;

Fig. 7 is a detail front view, similar to Fig. 4, showing the ratchet mechanism and associated parts at the left-hand end of the machine;

Fig. 8 is a detail section on the line 8—8 of Fig. 7 showing the means for shifting the drums of the nail selective mechanism;

Fig. 9 is a detail section on the line 9—9 of Fig. 7;

Fig. 10 is a detail horizontal section showing the nail guides, and the means for picking and releasing the nails;

Fig. 11 is an enlarged detail section on the line 11—11 of Fig. 7 showing the selector mechanism in inoperative position;

Fig. 12 is an enlarged detail perspective view of the nail picking and releasing mechanism, showing the advanced nail held against discharge into the funnel of the nail chute by the control means;

Figure 20:
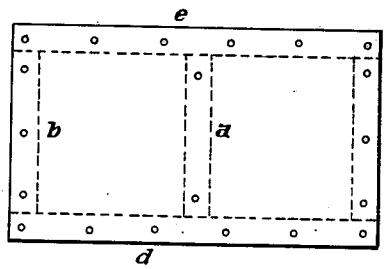
Figs. 20 and 21 are views of box ends or panels showing nail arrangements requiring respectively five and six stroke nailing operations.

In said drawings the machine is shown comprising a frame 10 including vertical side members 11 terminating at their reduced upper ends in extensions 12 connected by a transverse member 13. At the front of the frame is an adjustable work-support or table 14 to receive the parts to be nailed.

15 denotes a cross-head which is slidably mounted on the extensions 12 of the frame and adapted to be reciprocated vertically through pitmans 16 each having one end pivotally connected to one end of the cross-head 15, and its other end pivotally secured to a crank 17 actuated from the main driving shaft 18 of the machine.

Arms 20 and 20ª extend from the transverse member 13 at opposite sides of the machine and are provided with bearings at their ends. A short shaft 21 journaled in the bearing of the arm 20 is provided at its inner end with an arm 22 connected by a link 23 to the lugs 24 mounted on the cross-head 15, whereby the shaft 21 may be oscillated from the cross-head. Upon the shaft 21 at the opposite side of its bearing is loosely mounted a sleeve 22' having an arm 22ª. The sleeve 22' is provided with a recessed portion 22ᵇ adapted to receive a spring-actuated locking pin 22ᶜ carried by a collar or sleeve 22ᵈ secured to the shaft 21 by a set screw 22ᵉ. The collar 22ᵈ may be secured by the set screw 22ᵉ in various adjusted positions about the shaft 21 with the spring-actuated locking pin 22ᶜ engaged in the recessed-portion 22ᵇ to thereby lock the arm 22ª to the shaft 21 in the desired angular position. The arm 22ª is connected through link 25 to the swinging support 26 for the spring-pressed pawl 27 mounted thereon and adapted to engage either of the ratchet wheels 29, 29ª fixed to an axially movable shaft 28 adapted to be rotatively actuated thereby. The support 26 comprises a pair of arms 26ª pivotally supported at corresponding ends about the shaft 28 at opposite sides of the ratchets 29, 29ª and connected at their opposite ends by a shaft 26ᵇ. The pawl 27 is pivotally mounted upon the shaft 26ᵇ in position to engage either ratchet 29, 29ª, and is retained in such engagement by the torsion spring 27ª. The actuating link 25 is pivotally connected at one end to the shaft 26ᵇ and carried thereby, and at its opposite end to the arm 22ª through a pivot pin 25ª provided with a removable cotter pin 25ᵇ or like device for rendering the link 25 at the latter end readily disconnectable from the arm 22ª for a purpose hereinafter more fully described.

The shaft 28, which extends transversely across the machine, has fixed thereon at regular intervals drums or cylinders 30 provided adjacent their peripheral edges with two rows of stops or projections 31, 31ª each of a total number representing a multiple of certain lesser numbers corresponding to the number of operating strokes required per panel operated upon, and the number of stops in one row differing from the number in the other row. The said stops or projections preferably comprise screws which are removably secured in the peripheries of the drums or cylinders 30 in two parallel rows, of which one row consists, for example, of ten screws, and the other of twelve screws.

The shaft 28 together with the ratchets 29, 29ª is adjustable axially to bring either row 31 or 31ª of stops into position to selectively control the feeding operation as hereinafter described. The shaft 28 when adjusted is advanced step-by-step through operation of the proper ratchet 29 or 29ª, the ratchets having teeth corresponding in number with the number of stops in the respective rows 31, 31ª. When the shaft 28 is adjusted, the pawl 27 engages the proper ratchet for imparting step-by-step movement thereto. The shifting of the shaft 28 from one feed control position to the other is effected by a single mechanism manually actuated. For this purpose a shaft 32 is secured to the frame members 33 in parallelism with the shaft 28 which is journaled in bearings 33ª in said members 33. A slide member 34 is mounted upon the shaft 32 and is guided thereby. The slide 34 has a transverse bearing 35 thereon in which is rotatably supported a short shaft 36 having fixed upon its forward end a crank 37 provided with an operating handle 38. To the rear end of the shaft 36 is secured a disk 39 having a stud pin 40 arranged eccentrically thereon to which is pivotally secured one end of a link 41 having its other end pivotally secured to a collar or head 42 fixed on the shaft 32. When the handle 38 is rotated from the position against the stop 44 (see Figs. 4 and 7) to the position against the stop 43 of the slide 34, the stud pin 40 will be moved to the opposite side of the axis 36 causing the slide 34 to move a short distance away from the fixed head 42. When the handle 38 is moved in the reverse direction, the slide moves towards the fixed head 42. The movement of the slide 34 is transmitted to the shaft 28 through a depending member 45 terminating in a brake member 46 embracing a collar 28ª secured to the said shaft 28 between two adjacent drums or cylinders 30 which serve as abutments therefor. The brake comprises two parts 46, 46ª provided with a lining 46ᵇ. The parts 46, 46ª are maintained in operative relation to the shaft 28 by bolts or screws 47, 47ª. The tension exerted by the brake members 46, 46ª is adjusted by the wing nut 48 operating upon the bolt 47ª secured at one end to the brake member 46 and passing loosely through the brake member 46ª. A spring 49 is disposed between the wing nut 48 and the brake member 46ª. The connection thus provided, upon movement of the slide 34, in one direction or the other, causes a corresponding axial movement of the shaft 28 and the parts carried thereon.

Axial movement of the shaft 28 also effects the movement of the ratchets 29 and 29ª therewith relative to the pawl support 26 and pawl 27 carried thereby. The ratchets are mounted upon and keyed to a reduced portion 28ᵇ of the shaft 28 against the shoulder 28ᶜ and are held in such position by a sleeve 28ᵉ retained on the shaft by nuts 28ª. The arms 26ª of the support 26 are loosely mounted upon the shaft part 28 and the sleeve 28ᵉ. A retaining member 33ᵇ is secured to the frame portion 33 and extends over the contiguous arm 26ª into the path thereof to prevent movement of the pawl support 26 upon axial movement of the shaft 28 in either direction, the frame member 33 cooperating for this purpose.

The selective mechanism, whereby during each cycle of operation the number of nail feeding operations at the several stations may be differentially controlled, includes the series of drums or disks 30, which are secured by set screws 30ª to the shaft 28. The drums 30 correspond in number with the number of feed controllers 50 employed and are disposed in the path of the said controllers.

The controlling means 50 are arranged in gangs upon the square shaft 51, and each consists of a member 52 slidably mounted upon said shaft 51, and normally held in position by means of a spring 53 against a stop 54 fixed on the shaft 51. At the forward side of each member 52 is secured an upwardly and forwardly-extending finger or projection 55 which is adapted to engage with the screws or projections 31, 31ª of the contiguous drum 30. A vertical nail stop 56 is pivotally secured intermediate its ends to said slidable member 52 and normally held in vertical position against a stop 57 by said spring 53 which is at one end secured to said stop 56, and at its other end secured to a screw 58 on said shaft 51. The lower end of the stop 56 is turned inwardly at 59, and is adapted to engage with and close the open forward end of the corresponding slotted nail chute 60 by which the nails to be driven are conveyed from the hopper or box 61, mounted at the upper end of the machine frame, and agitated by the mechanism including the link connection 61ª reciprocated by the crank 61ᵇ operated by the main drive mechanism. The stop 56 controls the delivery of nails 62 to the open upper ends or funnels of the nail feed tubes 63 which are connected at their lower ends to the nail chucks 64 into which extend the plungers 65 secured at their upper ends to the cross-head 15 of the machine, and actuated thereby to drive the nails from said chucks 64 into the work. Each feed controlling means 50 is also associated with the usual cooperating nail pick 66 which is adjustably supported in a depending member 67 pivoted to the shaft 51 by the screws 58, and provided with an arm 69 engaged by a spring 69ª to hold back within the nail chute 60 the line of nails when the latch 56 is actuated to release the foremost nail of the line at the discharge end of said chute 60 and cause the same to drop into the feed tube 63.

The two circular rows of screws or projections 31, 31ª on each drum 30 are spaced from each other. The stops or projections 31, 31ª are also spaced equally from each other in each row. For example the ten screws or projections of one row 31ª and the twelve screws or projections of the other row 31 are spaced equally apart.

The screws or projections 31, 31ª are removably secured in the drums 30, and are therefore formed as ordinary standard machine screws threaded into the drums as shown. The screws 31 or 31ª of each row are adapted to be successively moved into the path of movement of the corresponding control members 50, the said members each being provided with the projection 55 adapted to engage a screw 31, 31ª extending into the path thereof upon reciprocation of the square shaft 51. The step-by-step rotary movement is imparted to the shaft 28, and the drums 30 secured thereto, through the operation of one or the other of the ratchet wheels 29, 29ª, depending upon which row of screws 31, 31ª is in operative position and relation to the member 52. In Fig. 4 of the drawings the shaft 28 is adjusted to place all of the right-hand rows of screws 31ª of the drums 30 in operative relation to the members 52, and, as illustrated, the ratchet wheel 29ª is then positioned to be engaged by the pawl 27 actuated through the medium of the arm 22ª, and link 25. When the row 31ª consists of ten lugs or screws the ratchet wheel 29ª is provided with the corresponding number of teeth so that a complete revolution of the shaft 28 will represent ten steps of movement. By removing one or more of the lugs of the row 31ª at each station the number of nailing operations effected at the several stations during a cycle of operation may be selectively determined. The selective adjustment thus made determines the number of nails and the location thereof driven at each stroke of the head 15 and supplied to one or more of the chucks 64. Upon the successive strokes constituting a complete cycle of operation of the machine, according to the selective adjustment, the nails are supplied and applied to the work in the same or different numbers and in various sequential orders. When it is desired to feed nails continuously at any one station with the drums 30 in the axial position shown all of the screws or lugs 31ª may be removed so as not to impede the movement of the contiguous members 52.

When the selective mechanism is adjusted to place the right hand row of stops 31ª in operative relation to the feed controllers 52, as above described, the machine is adapted to operate continuously upon a uniform run of work which are subjected to strokes, or have applied thereto lines or groups of nails all of a number constituting a divisor of "ten" only, the stops or pins in said row 31ª being ten in number. When the selector mechanism having the "ten stops" is in operative position, the machine is capable of operating continuously and in proper sequential order upon successive panels which are termed herein as a "five-stroke" or a "two-stroke" panel, such as those shown in Figs. 20 and 22. When it is required to operate continuously upon a uniform run of work in which the strokes to be applied thereto are divisors of a number other than "ten", such as upon the "six-stroke" or "three-stroke" panels illustrated in Figs. 21 and 23, I am able by means of the simple manipulation afforded by the handle 38 to shift the selective mechanism to a position rendering the left hand row 31 of twelve stops or screws operative relative to the feed control. The selector mechanism having the "twelve stops", when operative, renders the machine available for operation continuously and in proper sequential order upon a succession of work, such as two, three, four, and six stroke panels, the stroke numbers being divisors of twelve. When it is desired to shift the selective mechanism to render the left hand row 31 of twelve stops operative, the shaft is rotated slightly, the pawl 27 then being disengaged, to move the screws or lugs 31ª out of alignment with the projections or fingers 55 of the members 52, whereupon the shaft 28 is then moved axially to the right by operation of the crank 37 and caused to assume the position shown at Fig. 7.

Movement of the shaft 28 to the right, as aforesaid, positions each of the projections or fingers 55 of the members 52 between the two rows of projections 31, 31ª of the corresponding drum 30 in position for cooperation with the row of lugs 31. The shaft 28 is then rotated slightly by hand so that the several fingers 55 will register with the projections or lugs of the rows and be in operative relation thereto. The pawl 27 is now released and engaged with the twelve-toothed ratchet 29ª which has been moved axially to pawl-engaging position with the shaft 28. Selective and differential operation is attained by removing one or more of the screws or lugs 31 of each of the drums, as required.

Should the projection 55 on any member 52 engage a lug of either row 31, 31ª upon actuation of the shaft 51 to the left, the member 52 which is free to move relative to the shaft 51 will remain stationary to prevent dispensing of the nail. The movement of the shaft 51 and a member 52 relative to each other tensions the spring 53 which, upon the return movement of the shaft causes the members 52 to reengage the stops 54. This operation is illustrated at Fig. 5.

At Figs. 4 to 6 and 15 is shown the cam mechanism for actuating the shaft 51 which is returned to and maintained in normal position by a spring 70 mounted upon the right hand end of the said shaft 51 between the frame members 33 and a head 72 fixed on said shaft 51. The cooperating cam members 73, 74 have cooperating cam faces 73ª, 74ª. The cam member 73 is loosely mounted and slidable upon an axial shaft 75, and is retained against rotation with the shaft 75 by sliding engagement with the parallel stud 76. The member 73 is provided at its extended upper portion with a bearing face 77 normally in engagement with the head 72 on the end of shaft 51 and exerts, when actuated, a normal pressure upon the shaft 51 only. The cam member 74 is also mounted upon the shaft 75 for rotary movement relative thereto. The said shaft 75 is rotated or oscillated by the cam arm 22, and the cam member 74 is locked to the shaft 75 by means of a spring actuated pin 79 engaging with a recess 80 in said cam member 74. The pin 79 is mounted in a housing 80 secured to the shaft 75 by a screw 81.

In Figs. 4 and 5 is shown an arrangement in which the selector mechanisms including the drums 30 and shafts 28 of two similarly operated nailing machines are coupled together for operation or advancement from the single ratchet mechanism 29, 29ª. The shafts 28 are arranged in alignment and are connected together at the contiguous ends by the coupling 82 having sockets 83 receiving the ends of the shafts 28, the parts being secured together by the pins 84. The selective mechanism of the two machines may be independently adjusted to operate in the same or different manner, and, upon such adjustment, the shafts 28 are advanced step-by-step by the ratchet 29 or 29ª to cause simultaneous operation of the two mechanisms in accordance with the respective adjustments thereof.

When the volume of work to be operated upon is large, as well as varied, it is more economical to have available for use several complete selective mechanisms including the shaft 28 and drums 30 of predetermined different adjustments, and to provide means for rendering any such selector mechanism, as a unit, readily removable from the machine and replaceable therein according to the requirements of the work. This obviates the need for adjusting and readjusting the pins 31, 31ª of the same set of drums 30 each time the work to be operated upon necessitates a change in the selective adjustment or a change in the stroke sequence.

Figure 17:
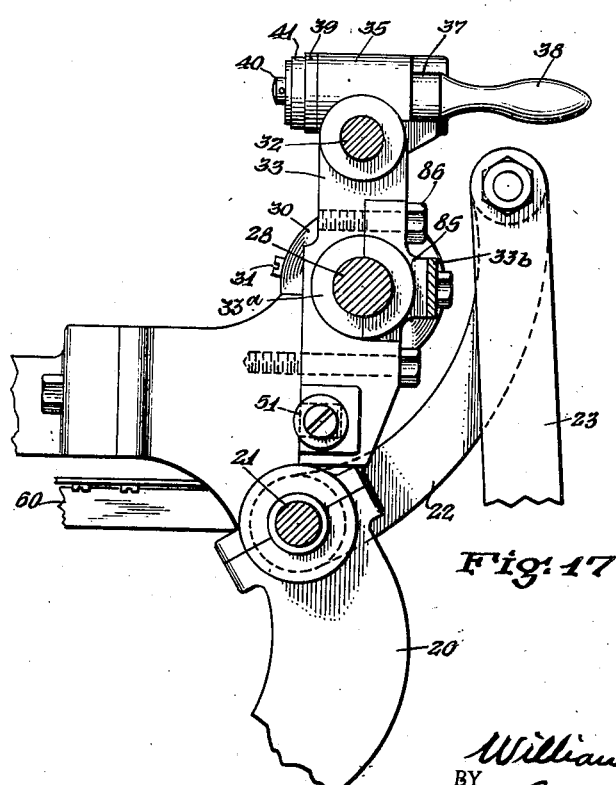
Fig. 17 is a section on the line 17—17 of Fig. 7 showing the means for allowing the removal of the selector shaft and parts carried thereby as a unit.
Figure 18:
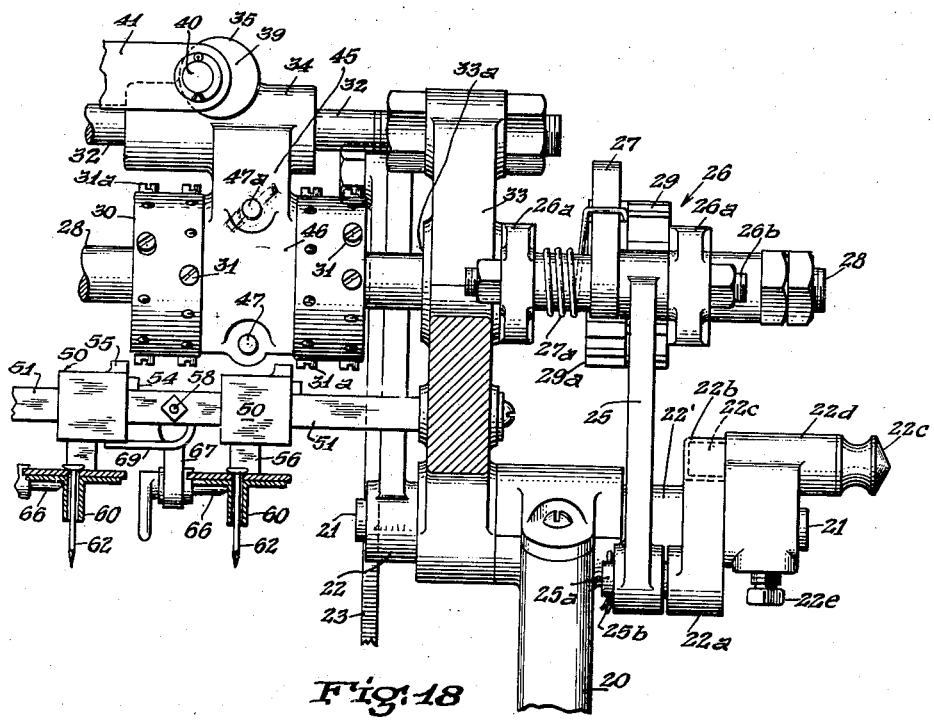
Fig. 18 is a rear elevation of the ratchet mechanism and the actuating means therefor.
Figure 19:
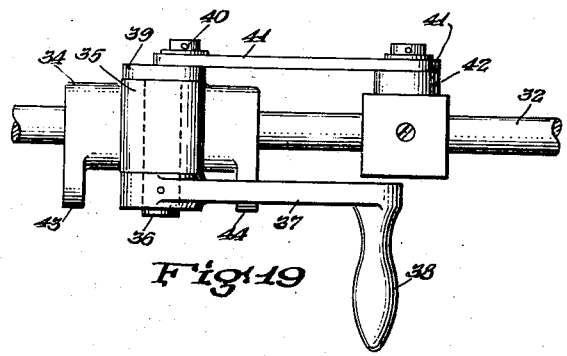
Fig. 19 is a plan of the selector shifting mechanism.

As shown more clearly in Fig. 17 I provide means for allowing the shaft 28 together with the parts carried thereby to be bodily removed as a unit from its bearings to be replaced by another unit having a different selective adjustment or stroke sequence.

For this purpose, the frame members 33 each includes a removable section or part 85, comprising substantially a half of the bearing, which is secured in place by a screw 86. After removing the members 85 at the ends of the shaft 28, and after disconnecting the lower end of the link 25 by removing the cotter pin 25ᵇ and after disconnecting the brake member 46ª, the shaft 28 may be bodily removed at the front of the machine together with the drums 30, ratchets 29, 29ª and support 26 to be replaced by another selector means of different adjustment. By providing removable bearing sections 85 for both machines shown in Figs. 4 and 5, the coupled shafts 28 together with the coupling 82 may be as readily removed.

Figure 22:
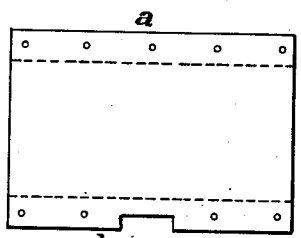
Figs. 22 and 23 are views of box ends or panels showing nail arrangements requiring respectively two and three stroke nailing operations.

The operation of the machine will be largely obvious from the foregoing description. In a nailing machine of the character described, the nailing chucks 64 and the feeding means 63 are arranged as a gang either in alignment with each other or in staggered relation, and vary in number according to the size of the work to be operated upon. A selector drum 30 is associated with the control 52 for each feeding means. When the work to be operated upon is either a "five-stroke" panel or a "two-stroke" panel as shown in Figs. 20 and 22, the arm 37 is swung to the position shown in Fig. 4, thereby placing the right hand row of stops 31ª in operative relation to the fingers 55 of the controllers 52. With the machine disclosed herein as an example, in the absence of the stops of the several rows 31ª, the machine is capable of driving six nails at each stroke of the head 15 at locations determined by the positions of the chucks 64. When it is desired to prevent the feed of a nail to one or more of the chucks 64 at any of the successive strokes during a complete cycle of operation, stops 31ª are secured to the corresponding drums 30 in positions to prevent the feeding operation at the strokes desired. Taking, for example, the panel shown in Fig. 20, the successive nailing strokes are designated thereon as a, b, c, d and e. At the first nailing operation a two nails, located as shown, are to be driven, at the second and third nailing operation b and c three nails, located as shown, are to be driven, and at the fourth and fifth operations d and e six nails, located as shown, are to be driven. The operator presents the various sides or portions of the panel to the machine for receiving the strokes in proper order a, b, c, d and e. At the first stroke of the machine four screws or stops 31$^a$ of as many drums are in position to prevent operation of the corresponding controls 52. At the second and third strokes three screws of as many drums are positioned to prevent operation of the corresponding controls 52. At the fourth and fifth strokes all six of the feeding controls 52 are left free to operate. The screws 31$^a$ are positioned or removed in the same order for the remaining five strokes of the machine representing the cycle of operation.

Upon each nailing stroke of the machine the shaft 51 is reciprocated by the cam mechanism 73, 74, the feed controls 52 being free to move therewith to release the nails in the absence of screws 31$^a$ in the paths of the fingers 55. When a finger 55 of any control 52 engages a pin 31$^a$ the control remains relatively stationary to prevent the feed at the corresponding position (see Fig. 5). The gate members 56 carried by the members 52 are pivotally mounted and retained in engagement with the stops 57 by the springs 53 to enable the gate members 56 to yield upon the return movement of the shaft 51 should a bent or defective nail become lodged in the discharge chute 60 in the path of any member 56. During the cycle of operation of the machine the shaft 28 and the selective means carried thereby is advanced step-by-step by the action of the pawl 27 upon the ten-toothed ratchet 29$^a$. The pawl 27 is actuated from the head 15 through the transmission means 23, 22, 21, 22$^a$, 25 and 26. The brake 46, 46$^a$ serves to steady the step-by-step movement so as to properly align the stops 31$^a$ in the successive positions of the drums 30 with the fingers 55.

Figure 21:
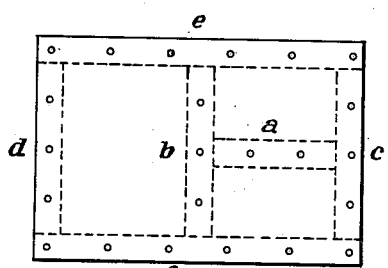
Figure 23:
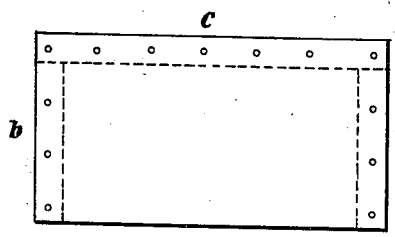
Figure 1:
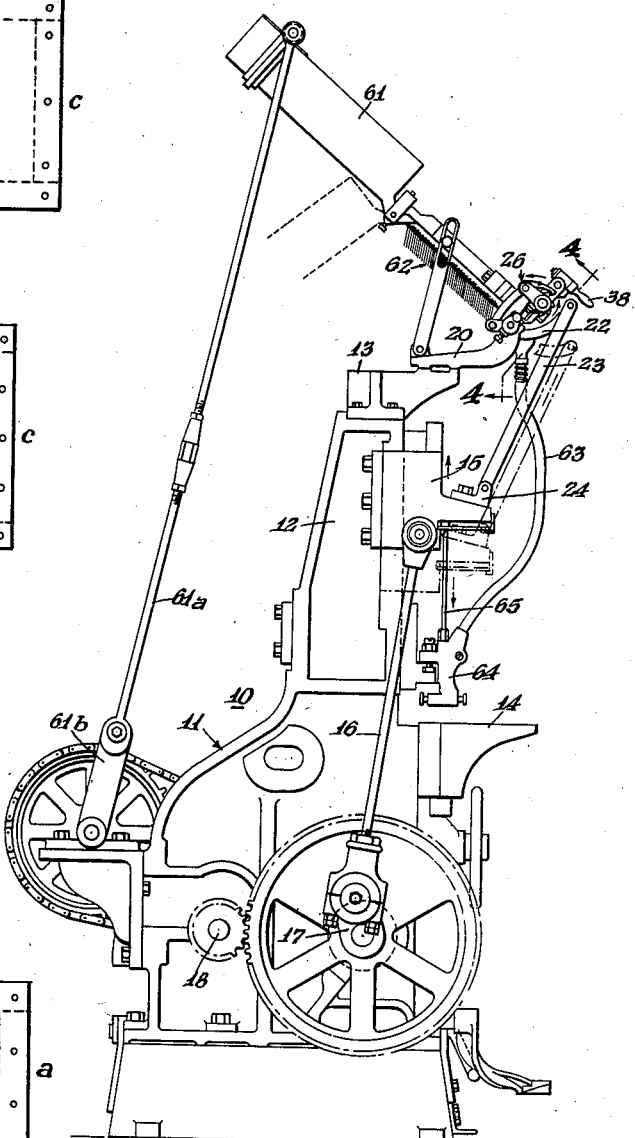
Figure 1 is a side elevation of a nailing machine with one form of feed mechanism embodying my said invention incorporated therewith.
Figure 13:
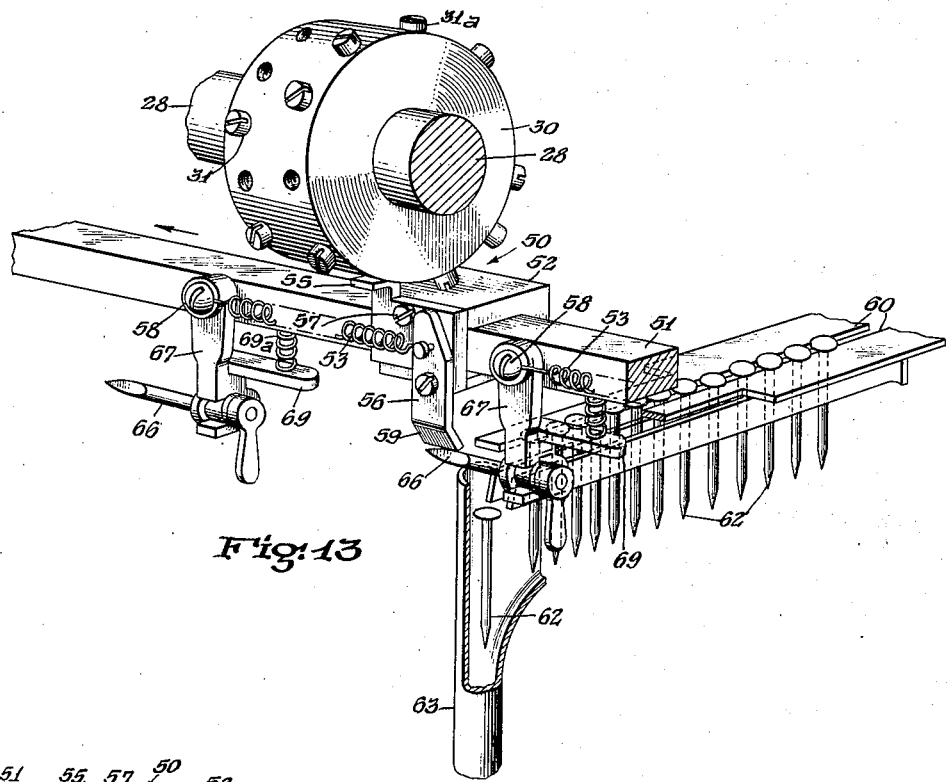
Fig. 13 is a view similar to Fig. 12 with the advanced nail released by the control means.
Figure 14:
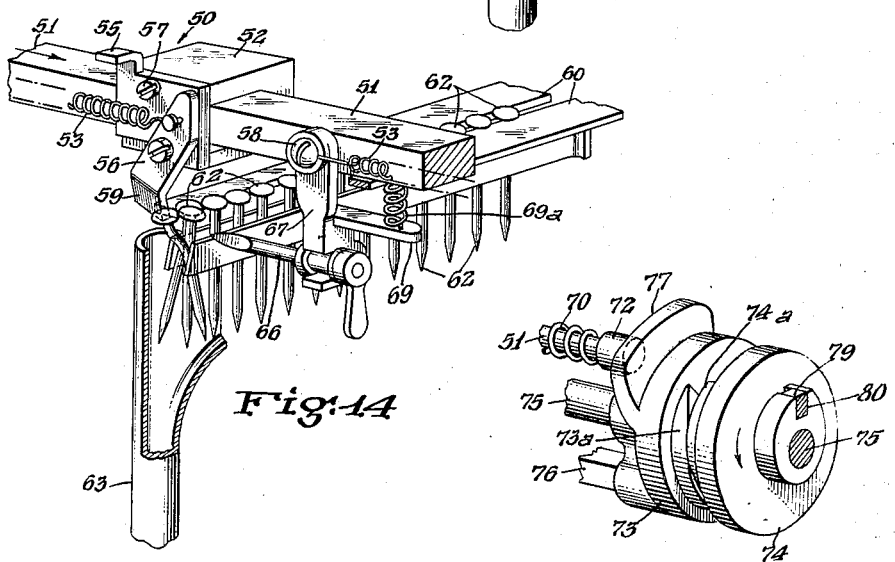
Fig. 14 is a view of the same parts illustrated at Figs. 12 and 13 showing the manner of clearing a deformed nail which is jamming the machine.
Figure 15:
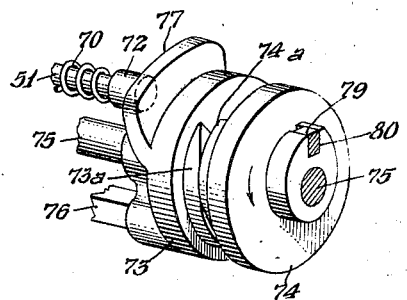
Fig. 15 is an enlarged detail perspective view of the cam mechanism for actuating the shaft carrying the nail releasing mechanism.
Figure 16:
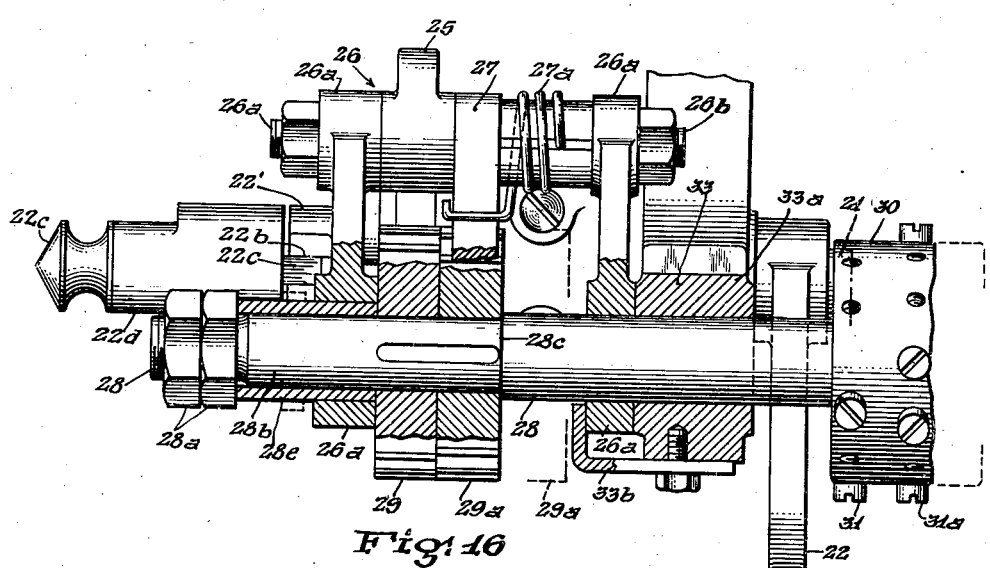
Fig. 16 is a detail plan, partly in section, showing the ratchet mechanism for actuating the selective mechanism.

When it is desired to operate upon six-stroke or three-stroke panels, as shown in Figs. 21 and 23, or upon other panels in which the number of strokes applied thereto is a divisor of twelve, the handle 37 is swung from the position shown in Fig. 4 to the position shown in Fig. 7. This manipulation through the brake 46, 46$^a$ serving as a connector moves the shaft 28 together with the parts carried thereby to the right to position the left hand pins 31 of the several drums in position to control the several nail feeding means and to position the ratchet 29$^a$ in operative relation to the pawl 27. When the parts are in this position the shaft 28 is advanced twelve steps during a cycle of operation thereof so that "three-stroke", "four-stroke" or "six-stroke" panels can be operated upon in proper and repeated sequential order as successive panels are presented to the machine to the be operated upon. The number of nails driven at each stroke and the location thereof are determined by the relative position of the stops 31 of the drums, as described above in connection with the stops 31$^a$. As one example, the stops 31 of the drums 30 may be arranged so that when the panel of Fig. 21 is presented to the machine to receive the successive strokes a, b, c, d, e and f in the successive positions shown, the number of nails driven at each stroke and the location thereof will be as indicated in the Fig. 21.

By my invention I am enabled to render the nailing machine capable of operating continuously in repeated sequential order upon various runs of work in which the number of nailing strokes required to complete each piece of one run differs from the number of nailing strokes required to complete each piece of another run.

This result is obtainable by providing a plurality of feed governing means having feed governing operations per cycle differing from each other in number and by rendering one or the other of said feed governing means operative depending upon the number of nailing strokes required to complete a given piece of work, the coordination being such that the number of nailing strokes for a given piece of work is an exact divisor of the number of the feed governing operations of the feed governing means in operative position, and that the ratio of the number of feed controlling operations per cycle and the number of nailing operations per article is always an integer.

The shaft 28 is readily shifted from one axial position to the other and retained or held in said positions against axial movement by swinging the crank 37 across dead center from one horizontal position to the other, the actuating mechanism serving to lock the parts in both positions against axial movement because of the link 41 and the eccentricity of the pivot 40 relative to the axis 36. The member 46, which functions effectively as a brake during the rotary movement of the shaft, is held thereon against axial movement relative thereto so that, when the slide member 34 is locked, the brake 46 forming a part thereof become effective to hold either set of selector devices in proper relation to the controlling means.

The selector mechanism may be prevented from operating by withdrawing the pin 22$^c$ from its socket, which disconnects the ratchet mechanism from the oscillating shaft 21 and by rotating the shaft 28 slightly by hand to bring the spacings between adjacent pins 31 (or 31$^a$) opposite the projections 55 as shown in Fig. 11. Upon said adjustment the nails will be continuously fed from all of the stations.

Further, in my invention the selector mechanism may be readily removed as a unit and replaced by another of a different adjustment without the loss of time required for readjusting the pins 31, 31$^a$ of the several drums whenever a run of panels of a different design from that previously run is to be operated upon.

Having thus described my said invention what I claim and desire to secure by Letters Patent is:

1. A machine of the character described including a nail feed mechanism comprising means for controlling the feed of nails, a plurality of selectively adjustable feed governing means capable of cyclically performing successive governing operations differing from each other in accordance with the selective adjustment of each, manually operable means for rendering one or the other of said feed governing means operative with relation to said controlling means, and means for actuating said several feed governing means.

2. A machine of the character described including a nail feed mechanism comprising means for controlling the feed of nails, a plurality of selectively adjustable cyclically operable feed governing means, said feed governing means being capable of performing during their respective cycles of operations successions of selective operations differing in number from each other, means for cyclically actuating each of said feed governing means, and means for manually shifting said feed governing means to render one or the other of said feed governing means operative with relation to said controlling means.

3. A machine of the character described including a nail feed mechanism comprising means for controlling the feed of nails, a plurality of selectively adjustable feed governing means, said feed governing means being capable of performing during their respective cycles of operation successions of selective operations differing in number from each other, means for rendering one or the other of said feed governing means operative with relation to said controlling means, and means for advancing either of said feed governing means when in operative position through a succession of steps per cycle corresponding in number with the number of selective operations characteristic of the feed governing means.

4. A machine of the character described including a nail feed mechanism comprising means for controlling the feed of nails, a plurality of selectively adjustable feed governing means capable of performing during the respective cycles of operation successions of selective operations differing in number from each other, the number of selective operations performed by one of said feed governing means being divisible by the number corresponding to the number of nailing strokes to be applied to each of a series of similar articles constituting a given run of work, and the number of selective operations performed by the other of said feed governing means being divisible by a different number corresponding to the number of nailing strokes to be applied to each of a series of similar articles constituting another run of work, means for rendering one or the other of said feed governing means operative with relation to said controlling means, and means for advancing either of said feed governing means when in operative position.

5. A machine of the character described including a nail feed mechanism comprising a plurality of nail feeding means, means for controlling the discharge of nails from the several nail feeding means, feed governing means including a plurality of series of selectively adjustable devices associated with said controlling means at each of said nail feeding means, manually operable means for rendering one or the other of the corresponding series of selectively adjustable devices operative with relation to said controlling means, and means for actuating said feed governing means to advance the devices of each corresponding series into operative relation to said controlling means.

6. A machine of the character described including a nail feed mechanism comprising a plurality of nail feeding means, means for controlling the discharge of nails from the several nail feeding means, feed governing means including a plurality of selectively adjustable devices associated with said controlling means at each of said nail feeding means, said devices being capable of performing during their respective cycles of operation successions of selective operations differing in number from each other, means for rendering the corresponding selectively adjustable devices operative with relation to said controlling means, and means for actuating said feed governing means to advance either set of said devices in accordance with the number of selective operations characteristic thereof.

7. A machine of the character described including a nail feed mechanism comprising a plurality of nail feeding means for controlling the discharge of nails from the several nail feeding means, feed governing means including a rotatable and axially movable shaft and a plurality of selectively adjustable devices secured to said shaft and associated with said controlling means at each of said nail feeding means, means for axially shifting said shaft for rendering either set of corresponding selectively adjustable devices operative with relation to said controlling means, and means for imparting a step-by-step rotary movement to said shaft in either of the axially adjusted positions thereof.

8. A machine of the character described including a nail feed mechanism comprising a plurality of nail feeding means, means for controlling the discharge of nails from the several nail feeding means, feed governing means including a rotatable and axially movable shaft and including a plurality of selectively adjustable devices secured to said shaft and associated with said controlling means at each of said nail feeding means, said devices being capable of performing during their respective cycles of operation successions of selective operations differing in number from each other, means for axially shifting said shaft for rendering either set of corresponding selectively adjustable devices operative with relation to said controlling means, and means for imparting different step-by-step rotary movements to said shaft according to the axially adjusted position thereof.

9. A machine of the character described including a nail feed mechanism comprising a plurality of nail feeding means, means for controlling the discharge of nails from the several nail feeding means, feed governing means including a plurality of circular rows of projections associated with said controlling means at each of said nail feeding means, means for supporting the several feed governing means for rotation and axial movement as a unit, means for axially shifting said supporting means to render either set of corresponding rows of projections operative with relation to said controlling means, and means for advancing said supporting means rotatively in either of the axially adjusted positions thereof.

10. A machine of the character described including a nail feed mechanism comprising a plurality of nail feeding means, means for controlling the discharge of nails from the several nail feeding means, feed governing means including a rotatable and axially movable shaft and a series of members thereon each having a plurality of rows of projections and being associated wtih said controlling means at one of said nail feeding means for governing the nail feeding operation, means for axially shifting said shaft to render either set of corresponding rows of projections operative with relation to said controlling means, and means for imparting a step-by-step rotary movement to said shaft.

11. A machine of the character described including a nail feed mechanism comprising a plurality of nail feeding means, means for controlling the discharge of nails from the several nail feeding means, feed governing means including a rotatable and axially movable shaft having secured thereon a series of selectively adjustable devices, a plurality of said devices being associated with said controlling means at each of said nail feeding means, and differing in the number of successive selective operations performed thereby during the respective cycles of operation thereof, means for axially shifting said shaft to render either set of corresponding devices operative with relation to said controlling means, and means including a plurality of ratchets secured to said shaft and a pawl cooperable with either ratchet for actuating said shaft to advance either set of selectively adjustable devices in accordance with the number of selective operations characteristic thereof.

12. A machine of the character described including a nail feed mechanism comprising a plurality of nail feeding means, feed governing means including a rotatable and axially movable shaft, a series of drums thereon each having a plurality of rows of removable projections thereon and being associated with one of said nail feeding means, a reciprocatable shaft, a series of members thereon for controlling the discharge of nails from said several nail feeding means, said members being movable with and relative to said reciprocatable shaft, and each thereof having means adapted to engage the projections of one row or the other of the contiguous drums for preventing movement of said member with said reciprocatable shaft, means for axially shifting said first-named shaft from one selective position to the other, means for rotating said first-named shaft with a step-by-step movement, and means for reciprocating said last-named shaft with each advance of said drums for causing certain of said members to release nails from the corresponding nail feeding means and for preventing other of said members by engagement wtih corresponding projections from releasing nails from other of said feeding means.

13. A machine of the character described including a nail feed mechanism comprising means for controlling the feed of nails, a rotatable and axially movable shaft, separate feed governing means carried by said shaft at positions rendering one thereof operative with relation to said controlling means in one axial position of said shaft and another thereof so operative in another axial position of said shaft, and actuating means for shifting said shaft from one position to the other.

14. A machine of the character described including a nail feeding mechanism comprising means for controlling the feed of nails, a rotatable and axially movable shaft, separate feed governing means carried by said shaft at positions rendering one thereof operative with relation to said controlling means in one axial position of said shaft and another thereof so operative in another axial position of said shaft, and actuating means for shifting said shaft from one position to the other, said last-named means including means serving to hold said shaft against axial movement in each of said axial positions.

15. A machine of the character described including a nail feed mechanism comprising means for controlling the feed of nails, a rotatable and axially movable shaft, separate feed governing means carried by said shaft at positions rendering one thereof operative with relation to said controlling means in one axial position of said shaft and another thereof so operative in another axial position of said shaft, a fixed guide member, brake means frictionally engaging said shaft and being retained thereon against axial movement relative thereto, said brake means having an extension slidably engaging said fixed guide member, and actuating means operatively associated with said guide member and said extension for shifting said shaft axially from one position to the other.

16. A machine of the character described including a nail feed mechanism comprising means for controlling the feed of nails, a rotatable and axially movable shaft, separate feed governing means carried by said shaft at positions rendering one thereof operative with relation to said controlling means in one axial position of said shaft and the other thereof so operative in another axial position of said shaft, a fixed guide shaft in parallelism with said first-named shaft, a member slidably mounted upon said guide shaft, a braking member frictionally engaged with said first-named shaft, retained thereon against axial movement relative thereto and connected with said slidably mounted member for movement therewith, a fixed member secured to said guide shaft, a rotatable actuating member mounted transversely upon said slidably mounted member, a link pivotally connected at one end to said fixed member and at its opposite end to said actuating member eccentrically of the axis thereof, and means for advancing said first-named shaft.

17. A machine of the character described including a nail feed mechanism comprising nail feeding means, means for controlling the feed of nails including a spring retracted reciprocatable member, feed governing means cooperating with said controlling means, and means for actuating said reciprocatable member including a power shaft, a cam member slidable on said power shaft having a portion engaging the end of said reciprocatable member, means for preventing rotation of said cam member with said shaft, and a cam member secured to said power shaft for rotation therewith, said rotatable cam member cooperating with said first-named cam member for imparting axial movement thereto.

18. A machine of the character described including a nail feed mechanism comprising means for controlling the feed of nails, a rotatable and axially movable shaft, separate feed governing means on said shaft each movable into operative relation with said controlling means upon axial adjustment of said shaft, ratchets secured to said shaft contiguous to one end thereof, a pawl support mounted coaxially with said shaft at said end for swinging movement, a pawl carried by said support for coaction with either ratchet, means for actuating said support, and means for preventing axial movement of said pawl support with said shaft.

WILLIAM F. HARRIETT.